No. 836,040. PATENTED NOV. 13, 1906.
G. M. HORNECKER & C. BLANKENHEIM.
BICYCLE.
APPLICATION FILED MAR. 12, 1906.
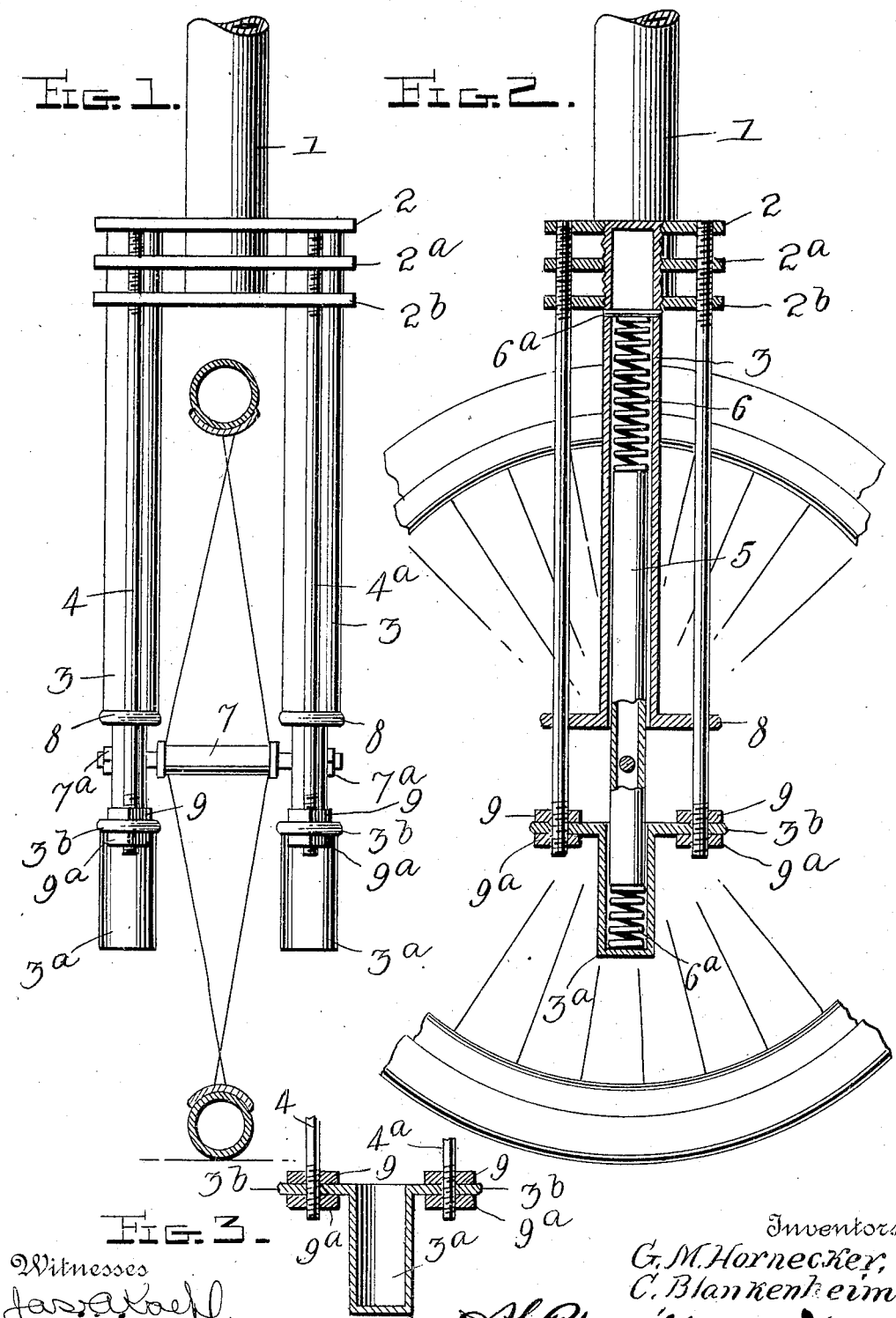

UNITED STATES PATENT OFFICE.

GEORGE M. HORNECKER AND CHARLES BLANKENHEIM, OF WHITING, INDIANA.

BICYCLE.

No. 836,040.         Specification of Letters Patent.         Patented Nov. 13, 1906.

Application filed March 12, 1906. Serial No. 305,617.

*To all whom it may concern:*

Be it known that we, GEORGE M. HORNECKER and CHARLES BLANKENHEIM, citizens of the United States, residing at Whiting, in the county of Lake and State of Indiana, have invented certain new and useful Improvements in Bicycles; and we do declare the following to be a full, clear, and exact description of the invention, such as will enable others skilled in the art to which it appertains to make and use the same.

This invention relates to bicycles or motor-cycles; and one of the principal objects of the same is to provide a cushioning device for the front wheel or wheels which shall be of simple construction and which will be completely housed in, so as to prevent dust and dirt from interfering with the action of the springs.

Another object is to provide a cushioning device for the hub of the front wheel of a bicycle in order to absorb the vibrations and jars to which this wheel is subjected upon rough roads.

These and other objects are attained by means of the construction illustrated in the accompanying drawings, in which—

Figure 1 is a front elevation of the front fork of a bicycle made in accordance with our invention. Fig. 2 is a vertical sectional view of the same looking toward the side of the fork. Fig. 3 is a detail section of a tubular brace and socket for one of the springs.

Referring to the drawings for a more particular description of our invention, the numeral 1 designates the fork-stem, and $2^a$ $2^b$ are plates which form the fork-crown. Secured to these plates is a tube 3, said tube extending downward and provided with a flange 8 at its lower end. A spring 6, contained within the tube 3, bears at one end against a stop $6^a$ within the tube 3 and its opposite end bears against a tube 5, said tube being fitted to slide within the tube 3 and having the hub 7 of the wheel secured thereto by means of lock-nuts $7^a$ or in any suitable manner. Small tubes 4 $4^a$ are secured to the fork-crown and extend through the flange 8 of the tube 3 and are secured at their lower ends by means of lock-nuts 9 $9^a$, fitted to the threaded ends of the tubes. A socket $3^a$, containing a spring $6^a$ and provided with a flange $3^b$, is fitted to the lower end of the tube 5, and through the flange $3^b$ the ends of the tubes 4 $4^a$ extend and are secured in place by means of said lock-nuts 9 $9^a$.

It will be understood from the foregoing paragraph that the entire cushioning device, consisting of two tubes 3 3 and springs 6 $6^a$, located upon opposite sides of the wheel, extend in a straight line from the stem 1 to the hub 7, and for this reason the wheel is easier to steer than would be the case of a curved fork of the usual construction. Moreover, the bearing is in a direct line and is more efficient on this account.

A cushioning device constructed in accordance with our invention may be used to advantage upon the front wheels of motor-vehicles and will absorb many of the shocks and vibrations incident to these wheels, for when applied to bicycles the tire may be either a cushion or solid one, since the cushioning device will serve to take many of the shocks or jars from the tire.

Various changes in the form, proportion, and the minor details of construction may be resorted to without departing from the principle or sacrificing any of the advantages of this invention.

Having thus fully described our invention, what we claim as new, and desire to secure by Letters Patent, is—

1. A cushioning device for bicycles comprising a tube secured to the fork-crown and provided with a flange at its lower end, a spring within the said tube, a wheel, the hub of which is secured to the tube sliding within the spring-tube and bearing against one end of said spring, a socket, a spring therein, flanges formed on said socket, and brace-tubes extending from the fork-crown through the flange of the spring-tube and through the flange of the socket, said braces being adjustably secured to the latter flange by lock-nuts, substantially as described.

2. A cushioning device for bicycles, comprising a tube carried by the fork-crown and provided with a flange at its lower end, a spring within said tube, a plunger element slidable in said tube and carrying a wheel, the upper end of said plunger element being engaged with said spring and the lower end projecting out of said tube, a socket to receive the lower end of said plunger element and provided with flanges, a spring in said socket engaged with the lower end of said plunger element, braces carried by the fork-crown and extending through apertures in the flanges of said tube and socket, and means for adjustably connecting the socket to said braces.

3. A cushioning device for bicycles, comprising a tube carried by the fork-crown, a spring in said tube, a plunger element slidable in said tube and projecting therefrom, its upper end being engaged with said spring, a socket into which the lower end of said plunger element projects, a spring in said socket engaged with said plunger element, and means for adjustably securing said socket to the fork-crown.

In testimony whereof we have hereunto set our hands in presence of two subscribing witnesses.

GEORGE M. HORNECKER.
CHARLES BLANKENHEIM.

Witnesses:
A. B. HOFFMAN,
JOHN W. DANICK.